(12) United States Patent
Gutmark et al.

(10) Patent No.: US 7,412,832 B2
(45) Date of Patent: Aug. 19, 2008

(54) METHOD AND APPARATUS FOR OPERATING GAS TURBINE ENGINES

(75) Inventors: Ephraim Jeff Gutmark, Cincinnati, OH (US); Bryan W. Callender, Cincinnati, OH (US); Steven Martens, West Chester, OH (US)

(73) Assignee: General Electric Company, Schenectady, NY (US)

( * ) Notice: Subject to any disclaimer, the term of this patent is extended or adjusted under 35 U.S.C. 154(b) by 705 days.

(21) Appl. No.: 10/811,219

(22) Filed: Mar. 26, 2004

(65) Prior Publication Data

US 2005/0210860 A1    Sep. 29, 2005

(51) Int. Cl.
F02K 1/00 (2006.01)
(52) U.S. Cl. .......................................... 60/770; 60/204
(58) Field of Classification Search ............ 60/770, 60/782, 785, 725, 39.5; 181/213; 239/265.13, 239/265.17
See application file for complete search history.

(56) References Cited

U.S. PATENT DOCUMENTS

| | | | |
|---|---|---|---|
| 2,990,905 A | 7/1961 | Lilley | |
| 3,463,402 A * | 8/1969 | Langston, Jr. .......... | 239/265.13 |
| 3,495,682 A | 2/1970 | Treiber | |
| 3,527,317 A * | 9/1970 | Motsinger .................... | 181/206 |
| 3,572,463 A * | 3/1971 | Eschenburg ................. | 181/215 |
| 3,612,212 A * | 10/1971 | Macdonald ................. | 181/175 |
| 3,625,009 A * | 12/1971 | Schairer et al. ............... | 60/221 |
| 3,630,311 A | 12/1971 | Nagamatsu et al. | |
| 3,650,348 A * | 3/1972 | Colebrook et al. .......... | 181/215 |
| 3,708,036 A * | 1/1973 | Duthion et al. ............. | 181/213 |
| 3,954,224 A * | 5/1976 | Colebrook et al. ..... | 239/265.13 |
| 3,964,569 A | 6/1976 | Neumann | |
| 4,064,961 A | 12/1977 | Tseo | |
| 4,135,363 A * | 1/1979 | Packman ...................... | 60/262 |
| 4,149,375 A * | 4/1979 | Wynosky et al. .............. | 60/262 |
| 4,215,536 A * | 8/1980 | Rudolph ...................... | 60/262 |
| 4,244,440 A * | 1/1981 | Matta et al. .................. | 181/213 |
| 4,284,170 A * | 8/1981 | Larson et al. ................ | 181/213 |
| 4,288,984 A * | 9/1981 | Bhat et al. ..................... | 60/262 |
| 4,446,696 A | 5/1984 | Sargisson et al. | |
| 4,474,259 A * | 10/1984 | Wright ........................ | 181/220 |
| 4,696,159 A * | 9/1987 | Horgan ....................... | 60/226.1 |
| 5,092,425 A * | 3/1992 | Shaw, Jr. ..................... | 181/213 |
| 5,291,672 A | 3/1994 | Brown | |
| 5,775,095 A * | 7/1998 | Zysman et al. ................ | 60/204 |
| 5,943,856 A * | 8/1999 | Lillibridge et al. ............ | 60/262 |
| 5,947,412 A | 9/1999 | Berman | |
| 6,308,898 B1 * | 10/2001 | Dorris et al. ........... | 239/265.17 |
| 6,336,319 B1 * | 1/2002 | Koshoffer ..................... | 60/770 |
| 6,502,383 B1 * | 1/2003 | Janardan et al. ............ | 60/226.1 |

(Continued)

FOREIGN PATENT DOCUMENTS

FR    1157063    5/1958

(Continued)

Primary Examiner—William H Rodriguez
(74) Attorney, Agent, or Firm—William Scott Andes, Esq.; Armstrong Teasdale LLP

(57) ABSTRACT

A method for operating a gas turbine engine includes channeling compressed air from the gas turbine engine to a noise suppression system, and selectively operating the noise suppression system such that air discharged from the noise suppression system generates a plurality of flow control mechanisms in the gas turbine exhaust flowpath.

20 Claims, 5 Drawing Sheets

U.S. PATENT DOCUMENTS

| | | | |
|---|---|---|---|
| 6,532,729 B2 * | 3/2003 | Martens | 60/204 |
| 6,718,752 B2 * | 4/2004 | Nesbitt et al. | 60/204 |
| 6,935,098 B2 * | 8/2005 | Bardagi et al. | 60/262 |
| 7,055,329 B2 * | 6/2006 | Martens et al. | 60/772 |
| 7,114,323 B2 * | 10/2006 | Schlinker et al. | 60/204 |
| 7,159,383 B2 | 1/2007 | Barton et al. | |
| 2004/0187474 A1 * | 9/2004 | Martens et al. | 60/204 |
| 2004/0237501 A1 | 12/2004 | Brice et al. | |
| 2005/0172611 A1 * | 8/2005 | Blodgett et al. | 60/262 |
| 2005/0214107 A1 * | 9/2005 | Gutmark et al. | 415/1 |

FOREIGN PATENT DOCUMENTS

| | | |
|---|---|---|
| GB | 1141784 | 1/1969 |
| GB | 2207468 | 2/1989 |
| WO | 0077380 A1 | 12/2000 |
| WO | 0229232 A1 | 4/2002 |

* cited by examiner

METHOD AND APPARATUS FOR OPERATING GAS TURBINE ENGINES

BACKGROUND OF THE INVENTION

This invention relates generally to gas turbine engines, more particularly to methods and apparatus for operating gas turbine engines.

At least some known gas turbine engines include a core engine having, in serial flow arrangement, a fan assembly and a high pressure compressor which compress airflow entering the engine, a combustor which burns a mixture of fuel and air, and low and high pressure rotary assemblies which each include a plurality of rotor blades that extract rotational energy from airflow exiting the combustor.

Combustion gases are discharged from the core engine through an exhaust assembly. More specifically, within at least some known turbofan engines, a core exhaust nozzle discharges core exhaust gases radially inwardly from a concentric fan exhaust nozzle which exhausts fan discharge air therefrom for producing thrust. Generally during engine operation, both exhaust flows approach their maximum velocity during high power engine operations, such as during take-off operations. During such operations, as the high velocity flows interact with each other and with ambient air flowing past the engine, substantial noise may be produced along the take-off path of the aircraft.

To facilitate reducing such noise, at least some known turbine engine exhaust assemblies utilize noise suppression equipment which includes at least one of tabs, mixing lobes, and/or a plurality of chevrons to enhance mixing the core and bypass exhaust flows. Although the tabs, mixing lobes, and chevrons facilitate suppressing noise during high power engine operating conditions, because the tabs, mixing lobes, and chevrons are mechanical devices which remain positioned in the flow path during all flight conditions, such devices may adversely impact engine performance during non-take-off operating conditions. Specifically, during cruise conditions, the tabs, the mixing lobes, and/or the chevrons may adversely impact specific fuel consumption (SFC) of the engine.

BRIEF DESCRIPTION OF THE INVENTION

In one aspect, a method for operating a gas turbine engine is provided. The method includes channeling compressed air from the gas turbine engine to a noise suppression system, and selectively operating the noise suppression system such that air discharged from the noise suppression system generates a plurality of flow control mechanisms in the gas turbine exhaust flowpath.

In another aspect, an assembly for a gas turbine engine is provided. The assembly includes a gas turbine nozzle, and a noise suppression system coupled to the gas turbine nozzle, the noise suppression system is selectively operable to facilitate generating a plurality of flow control mechanisms in the gas turbine nozzle flowpath.

In a further aspect, a gas turbine engine is provided. The gas turbine engine includes a core engine nozzle, a fan nozzle, and a noise suppression system coupled to at least one of the core engine nozzle and the fan nozzle, the noise suppression system is selectively operable to facilitate generating a plurality of flow control mechanisms in at least one of the core engine nozzle exhaust flowpath and the fan nozzle exhaust flowpath.

DETAILED DESCRIPTION OF THE INVENTION

Figure 1:
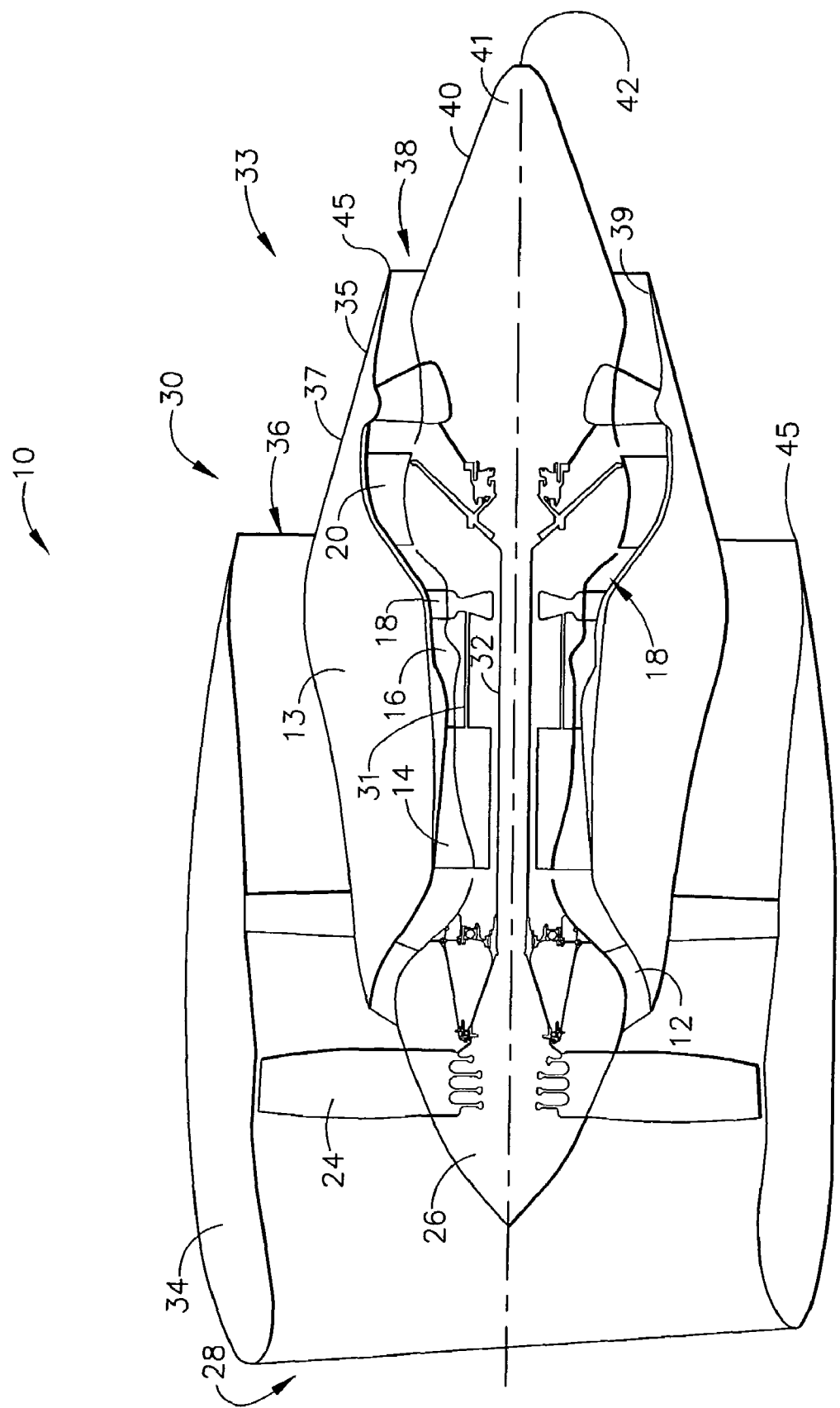
FIG. 1 is a schematic illustration of an exemplary gas turbine engine.

FIG. 1 is a schematic illustration of a gas turbine engine 10 including a fan assembly 12 and a core engine 13 including a high pressure compressor 14, and a combustor 16. Engine 10 also includes a high pressure turbine 18, and a low pressure turbine 20. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

An exhaust assembly 33 extends downstream from core engine 13 and includes an annular fan exhaust nozzle 34 that extends around, and is spaced radially outwardly from, a core engine exhaust nozzle 35. More specifically, fan exhaust nozzle 34 is positioned upstream from core exhaust nozzle 35 and is spaced radially outwardly from core engine exhaust nozzle 35 such that an annular bypass stream outlet 36 is defined between fan exhaust nozzle 34 and an engine cowling 37 extending circumferentially around core engine 13.

Core engine exhaust nozzle 35 also has an annular outlet 38 defined between an inner surface 39 of cowling 37 and an outer surface 40 of a centerbody or center plug 41. In an alternative embodiment, core engine exhaust nozzle 35 is known as a long-ducted mixed flow exhaust and is discharged into stream outlet 36 upstream from centerbody 41, such that core combustion gases are mixed with bypass stream flow prior to the mixture being discharged from exhaust assembly 33. In the exemplary embodiment, centerbody 41 extends aftward from core engine 13 such that core exhaust nozzle outlet 38 is upstream from an aft end 42 of centerbody 41. In an alternative embodiment, centerbody 41 does not extend downstream from nozzle outlet 38, and rather nozzle outlet 38 is downstream from centerbody 41.

During operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31. More specifically, to produce thrust from engine 10, fan discharge flow is discharged through fan exhaust nozzle 34, and core combustion gases are discharged from engine 10 through core engine exhaust nozzle 35. In one embodiment, engine 10 is operated at a relatively high bypass ratio which is indicative of the amount of fan air which bypasses core engine 13 and is discharged through fan exhaust nozzle 34. In an alternative embodiment, gas turbine engine 10 is operable with a low bypass ratio.

Figure 2:
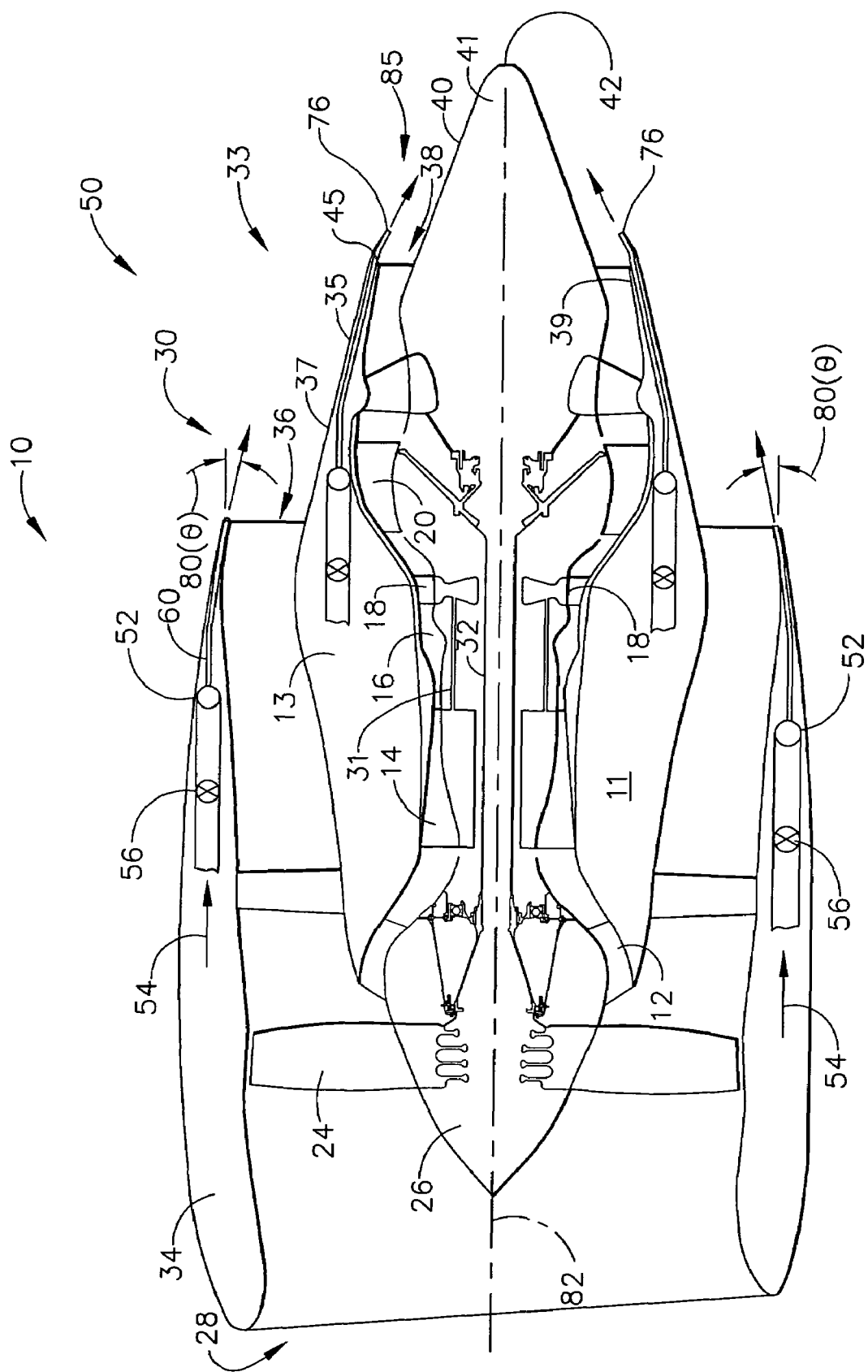
FIG. 2 is a side view of an exemplary noise suppression system that may be used with the gas turbine engine shown in FIG. 1.
Figure 3:
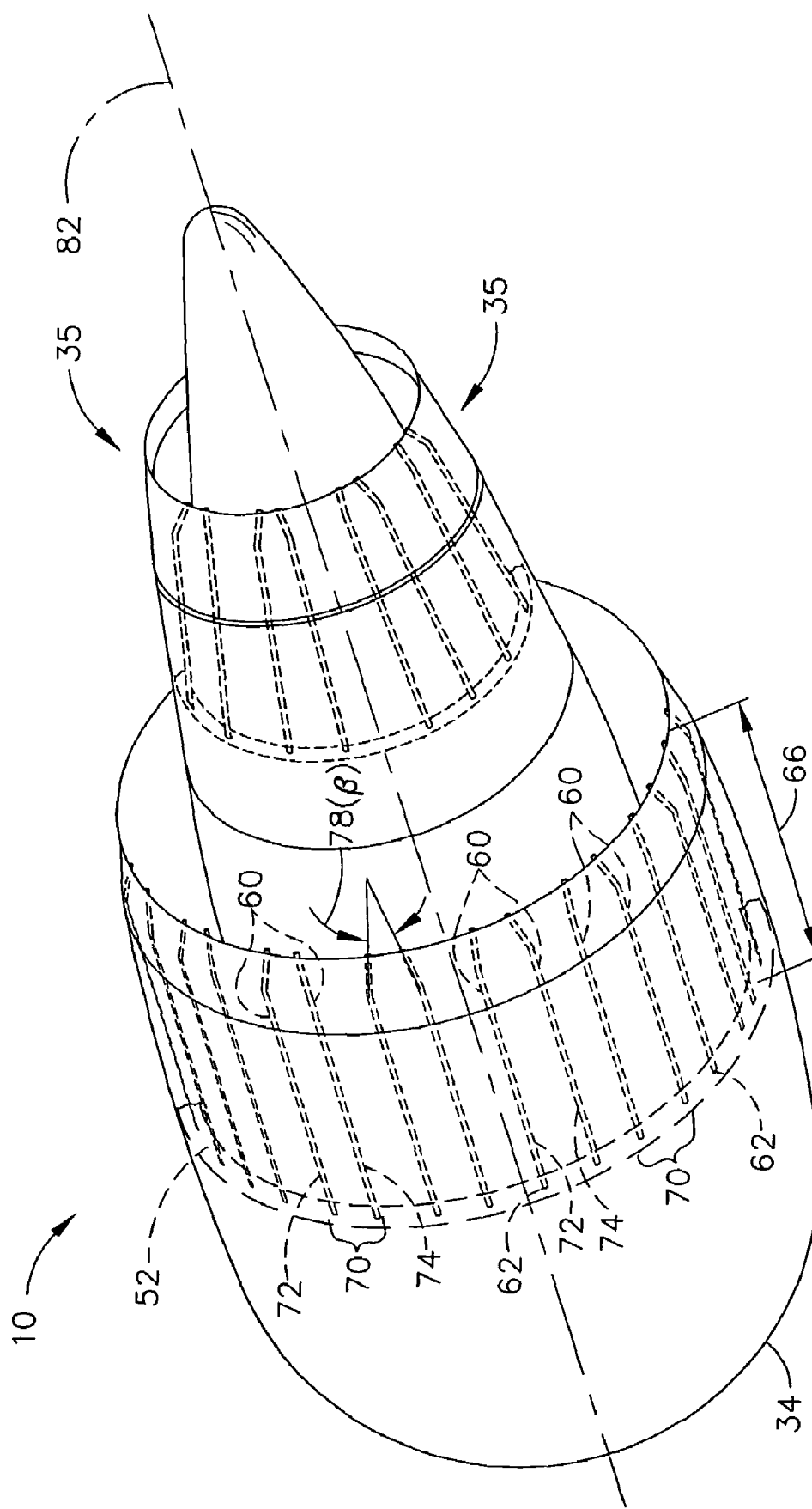
FIG. 3 is a perspective view of the noise suppression system shown in FIG. 2.

FIG. 2 is a side view of an exemplary noise suppression system 50 that can be used with gas turbine engine 10. FIG. 3 is a perspective view of noise suppression system 50. In an exemplary embodiment, noise suppression system 50 is operably coupled to core engine exhaust nozzle 35. Noise suppression system 50 includes a manifold 52 coupled to core engine exhaust nozzle 35 such that manifold 52 circumscribes core engine exhaust nozzle 35. Compressed air is channeled from an air source 54 through an actuation valve 56 into manifold 52. In the exemplary embodiment, air is supplied to manifold 52 from at least one of fan assembly 12, high pressure compressor 14, high pressure turbine 18, or low pressure turbine 20.

Noise suppression system 50 also includes a plurality of tubes 60 coupled to manifold 52 and operated such that air is discharged from manifold 52 through plurality of tubes 60 and into a core engine exhaust stream 85. In other embodiments, noise suppression system 50 does not utilize tubes 60, but rather air is discharged into core engine exhaust stream 85 through other means. Accordingly, in the exemplary embodiment, each tube 60 includes an upstream end 62, a downstream end 64, and a length 66 that is measured between upstream end 62 and downstream end 64, respectively. In the exemplary embodiment, length 66 is sized such that upstream end 62 is coupled to manifold 52 and downstream end 64 is coupled to an end 68 of engine exhaust nozzle 35. In the exemplary embodiment, tubes 60 are arranged in tube pairs 70 wherein each tube pair 70 includes a first tube 72 and a second tube 74.

In the exemplary embodiment, noise suppression system 50 includes eight pairs 70 of tubes 60 arranged azimuthally around an outer periphery of engine exhaust nozzle 35. In an alternative embodiment, tubes 60 are not arranged in pairs. In the exemplary embodiment, each tube 60 is substantially hollow, has a substantially circular cross-sectional profile, and includes an opening 76 that extends along length 66 of tube 60. Alternatively, tube 60 does not have a circular cross-sectional profile. In the exemplary embodiment, noise suppression system 50 includes four pairs 70 of tubes 60 arranged azimuthally around an outer periphery of core engine exhaust nozzle 35. Tubes 72 and 74 are separated by a first angle 78. In the exemplary embodiment, first angle 78 is approximately equal to thirty degrees. In another embodiment, tubes 72 and 74 are separated by a first angle 78 that is approximately equal to sixty degrees. Furthermore, each tube pair 70 is oriented at an injection angle 80 that is measured with respect to a centerline axis 82. Although noise suppression system 50 is shown as coupled to an outer periphery of core engine exhaust nozzle 35, it should be realized that noise suppression system 50 could also be coupled to an inner periphery of core engine exhaust nozzle 35.

During operation, air discharged from each tube pair 70 is discharged into core engine exhaust stream 85 such that the compressed air entering core engine exhaust stream 85 generates a flow control mechanism. For example, in the exemplary embodiment, each tube pair 70 generates a streamwise vorticity that is substantially analagous to a similar streamwise vorticity that is generated by a mechanical chevron nozzle. However, unlike mechanical chevrons, noise suppression system 50 can be operated in either an activated mode or a de-activated mode. When noise suppression system 50 is operated in the activated mode, air is supplied into manifold 52 and distributed substantially uniformly among the plurality of tube pairs 70. Since each tube pair 70 includes a first tube 72 and a second tube 74 that are offset by a pre-defined angle 78 and a predefined angle 80, air discharged from each tube pair 70 simulates that discharged from a mechanical chevron nozzle. When noise suppression system 50 is deactivated, no air is channeled through tube pairs 70.

Figure 4:
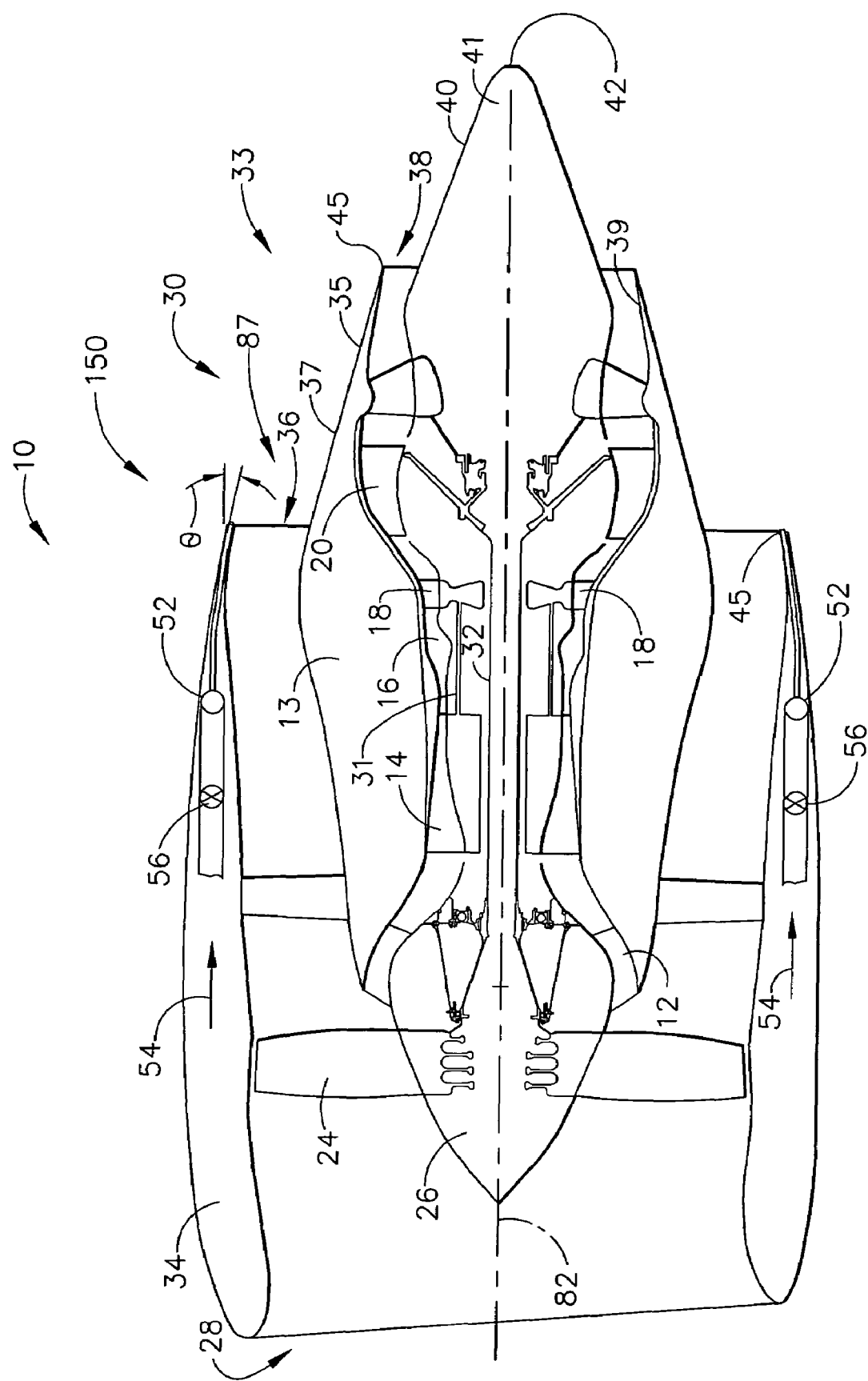
FIG. 4 is a side view of an alternative embodiment of a noise suppression system that may be used with the gas turbine engine shown in FIG. 1.
Figure 5:
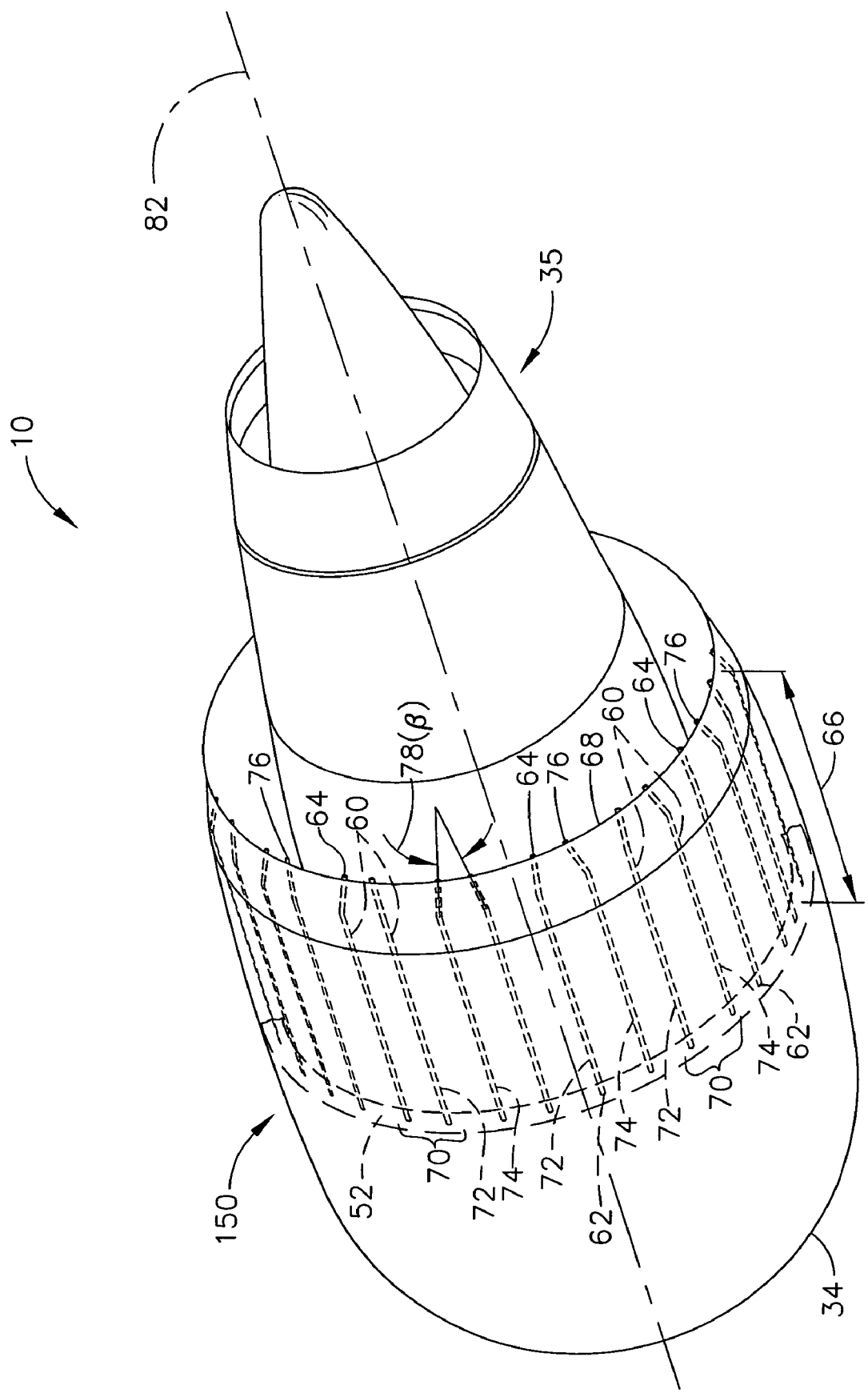
FIG. 5 is a perspective view of the noise suppression system shown in FIG. 4.

FIG. 4 is a side view of an exemplary noise suppression system 150 that can be used with gas turbine engine 10. FIG. 5 is a perspective view of noise suppression system 150. Noise suppression system 150 is substantially similar to noise suppression system 50, (shown in FIGS. 3 and 4) and components of noise suppression system 150 that are identical to components of noise suppression system 50 are identified in FIGS. 4 and 5 using the same reference numerals used in FIGS. 3 and 4.

In an exemplary embodiment, noise suppression system 150 is operably coupled to fan nozzle 34. Noise suppression system 150 includes a manifold 52 coupled to engine exhaust nozzle 35 such that manifold 52 circumscribes core engine exhaust nozzle 35. Compressed air is channeled from an air source 54 through an actuation valve 56 into manifold 52. In the exemplary embodiment, air is supplied to manifold 52 from at least one of fan assembly 12, high pressure compressor 14, high pressure turbine 18, or low pressure turbine 20. Alternatively, air may be supplied from any other pressurized air source. In another alternative embodiment, synthetic jets are utilized within noise suppression system 50, and as such, no pressurized air is supplied to noise suppression system 50.

Noise suppression system 150 also includes a plurality of tubes 60 coupled to manifold 52 and operated such that air is discharged from manifold 52 through plurality of tubes 60 and into a fan nozzle exhaust stream 87. Accordingly, each tube 60 includes an upstream end 62, a downstream end 64, and a length 66 that is measured between upstream end 62 and downstream end 64, respectively. In the exemplary embodiment, length 66 is sized such that upstream end 62 is coupled to manifold 52 and downstream end 64 is coupled to an end 36 of fan nozzle 35. In the exemplary embodiment, tubes 60 are arranged in tube pairs 70 wherein each tube pair 70 includes a first tube 72 and a second tube 74.

In the exemplary embodiment, noise suppression system 150 includes eight pairs 70 of tubes 60 arranged azimuthally around an outer periphery of engine exhaust nozzle 35. Each tube 60 is substantially hollow and includes an opening 76 that extends along length 66 of tube 60. In one embodiment opening 76 is approximately 0.125 inches in diameter. In another embodiment, opening 76 is approximately 0.0625 inches in diameter. In the exemplary embodiment, noise suppression system 50 includes four pairs 70 of tubes 60 arranged azimuthally around an outer periphery of core engine exhaust nozzle 35. Tubes 72 and 74 are separated by a first angle 78. In the exemplary embodiment, first angle 78 is approximately equal to thirty degrees. In another embodiment, tubes 72 and 74 are separated by a first angle 78 that is approximately equal to sixty degrees. Furthermore, each tube pair 70 is oriented at an injection angle 80 that is measured with respect to a centerline axis 82. Although noise suppression system 150 is shown as coupled to an outer periphery of fan nozzle 34, it should be realized that noise suppression system 150 could also be coupled to an inner periphery of fan nozzle 34.

During operation, air discharged from each tube pair 70 is discharged into fan nozzle exhaust stream 87 such that the compressed air entering fan nozzle exhaust stream 87 simulates a streamwise vorticity that is analagous to a similar streamwise vorticity that is generated by a mechanical chevron nozzle. However, unlike mechanical chevron nozzles, noise suppression system 150 can be operated in either an activated mode or a de-activated mode. When noise suppression system 50 is operated in the activated mode, air is supplied into manifold 52 and distributed substantially uniformly among the plurality of tube pairs 70. Since each tube pair 70 includes a first tube 72 and a second tube 74 that are offset by a predefined angle 78 and a predefined angle 80, the air discharged from each tube pair 70 into fan nozzle exhaust stream 87 simulates a similar streamwise vorticity that is generated by a mechanical chevron nozzle. When noise suppression system is deactivated, no air is channeled through tube pairs 70.

The above-described noise suppression system includes a manifold and plurality of pairs of hollow injection tubes coupled to the manifold. Each pair of tubes discharges air into either the fan nozzle exhaust stream or the core engine exhaust stream such that the discharged air enables the tubes to simulate the function of a mechanical eight-lobed chevron nozzle. Accordingly, the tubes facilitate decreasing engine noise when the noise suppression system is activated. More specifically, the above-described noise suppression system includes a manifold and plurality of pairs of hollow tubes that are oriented at complex angles which are selected to enable the air discharged into either the core engine exhaust stream or the fan engine exhaust stream to be discharged at a desired injection velocity, a desired relative velocity, and a desired mass-flow-rate that are variably selected to simulate the effects that may be generated by a mechanical chevron.

The injection flow can be controlled to facilitate maximizing the effect during take-off and landing, and can also be activated when desired or deactivated when not desired, e.g. during cruise, to facilitate eliminating performance penalties during most of the flight duration. Moreover, the noise suppression system can be operated either continuously or by pulsating control valve 56. Operating the noise suppression system by pulsating valve 56 facilitates increasing effective amount of secondary airflow injected into the exhaust stream by reducing the quantity of air required. Accordingly, the noise suppression system described herein facilitates reducing noise during takeoff or landing, and reducing or eliminating engine performance losses during cruise conditions. Moreover, the noise suppression system described herein can also be operated to facilitate reducing an infra-red signature generated by engine 10.

In other words, the fluidic injection system described herein includes a plurality of opposed vortex pairs that are distributed azimuthally around the jet shear layer of the gas turbine engine. The vortex pairs inject small "jets" of compressed air into the jet shear layer at an angle to the main flow which induces the formation of relatively small longitudinal vortices. The relatively small longitudinal vortices facilitate enhancing mixing between the core and fan flow, and between the fan and ambient flows and thereby facilitate reducing jet noise. Moreover, the enhanced mixing also facilitates reducing an infra-red signature generated by engine 10.

In the exemplary embodiment, the noise suppression system described herein facilitates reducing the gas turbine noise at substantially all operational frequencies. Additionally, increasing the injection velocity of air channeled through the tube pairs facilitates reducing the gas turbine noise.

Exemplary embodiments of noise suppression systems and exhaust assemblies are described above in detail. The noise suppression systems are not limited to the specific embodiments described herein, but rather, components of each assembly may be utilized independently and separately from other components described herein. For example, each noise suppression component can also be used in combination with other exhaust assemblies and/or with other noise suppression systems. Moreover, and for example, each noise suppression component can also be used in combination with engine assemblies that include mixing lobes and/or tabs to facilitate noise suppression and/or infra-red signature reduction.

While the invention has been described in terms of various specific embodiments, those skilled in the art will recognize that the invention can be practiced with modification within the spirit and scope of the claims.

What is claimed is:

1. A method for operating a gas turbine engine, said method comprising:
    positioning a noise suppression system comprising a manifold and a plurality of tubes within the gas turbine engine such that the plurality of tubes are coupled azimuthally around an outer periphery of a nozzle;
    coupling one end of each of the plurality of tubes to the manifold and coupling an opposite end of each of the plurality of tubes to the nozzle such that the plurality of tubes each extend away from the manifold;
    channeling compressed air from the gas turbine engine to the noise suppression system through the manifold;
    selectively operating the noise suppression system such that compressed air is distributed substantially uniformly among the plurality of tubes and is discharged from the plurality of tubes generating a flow control mechanism in a gas turbine exhaust flowpath; and
    orienting the plurality of tubes such that air discharged from the plurality of tubes forms a vortex.

2. A method in accordance with claim 1 wherein selectively operating the noise suppression system further comprises selectively operating the noise suppression system such that air discharged from the plurality of tubes facilitates reducing gas turbine noise generated during engine operation.

3. A method in accordance with claim 1 wherein channeling compressed air from the gas turbine engine to the noise suppression system further comprises:
    channeling compressed air from the gas turbine engine into the manifold; and
    discharging air from the manifold into a core engine exhaust stream through the plurality of tubes.

4. A method in accordance with claim 3 wherein the noise suppression system includes an actuation valve, wherein channeling compressed air from the gas turbine engine to a noise suppression system further comprises selectively operating the actuation valve to channel compressed air from the gas turbine engine to the manifold.

5. A method in accordance with claim 3, wherein the plurality of tubes includes a plurality of pairs of tubes, each pair including a first tube and a second tube, wherein discharging air from the manifold further comprises orienting the first tube and the second tube such that air discharged from the plurality of pairs of tubes generates a vortex in the gas turbine exhaust flowpath.

6. A method in accordance with claim 3 wherein said discharging air from the manifold further comprises discharging air from the manifold into a core gas turbine engine nozzle exhaust flowpath.

7. A method in accordance with claim 3 wherein said discharging air from the manifold further comprises discharging air from the manifold into a fan nozzle exhaust flowpath.

8. An assembly for a gas turbine engine, said assembly comprising:
    a gas turbine nozzle; and
    a noise suppression system coupled to said gas turbine nozzle, said noise suppression system comprising a manifold and a plurality of tubes, said plurality of tubes are azimuthally coupled to said gas turbine nozzle, each of said plurality of tubes comprises a first end coupled to said manifold and a second end coupled to said gas turbine nozzle such that said plurality of tubes each extend away from said manifold and are oriented such that air discharged from said plurality of tubes forms a vortex, said noise suppression system is selectively operable to facilitate generating a plurality of flow control mechanisms such that compressed air channeled through said manifold is distributed substantially uniformly among said plurality of tubes in said gas turbine nozzle flowpath.

9. An assembly in accordance with claim 8 wherein said noise suppression system further comprises:
an upstream end of said plurality of azimuthally arranged tubes coupled to said manifold and a downstream end of said plurality of azimuthally arranged tubes coupled to said gas turbine nozzle, said plurality of tubes are oriented such that air discharged from said plurality of tubes forms a vortex.

10. An assembly in accordance with claim 9 wherein said plurality of tubes comprise at least a first tube that extends radially inward at an angle ÿ with respect to a centerline axis, and a second tube that extends radially inward at the angle ÿ with respect to the centerline axis, said first tube and said second tube separated by an angle ÿ.

11. An assembly in accordance with claim 9 wherein said plurality of tubes are oriented to facilitate generating the vortex in a core gas turbine engine nozzle flowpath.

12. An assembly in accordance with claim 9 wherein said plurality of tubes are oriented to facilitate generating the vortex in a fan nozzle flowpath.

13. An assembly in accordance with claim 8 wherein said noise suppression system further comprises:
a plurality of pairs of tubes, each pair comprising a first tube and a second tube, said plurality of tube pairs coupled to said manifold, each said tube pair is selectively oriented to facilitate generating a vortex in said gas turbine nozzle flowpath.

14. An assembly in accordance with claim 8 wherein said noise suppression system further comprises an actuation valve selectively operable to discharge compressed air from said gas turbine engine to said noise suppression system.

15. A gas turbine engine comprising:
a noise suppression system comprising a manifold and a plurality of tubes, said plurality of tubes are azimuthally coupled to said gas turbine nozzle, each of said plurality of tubes comprises an upstream end coupled to said manifold and a downstream end coupled to said gas turbine nozzle, said plurality of tubes each extend away from said manifold, and are oriented such that air discharged from said plurality of tubes forms a vortex, said noise suppression system is selectively operable to facilitate generating a plurality of flow control mechanisms in said core engine nozzle flowpath.

16. A gas turbine in accordance with claim 15 wherein said noise suppression system further comprises:
the manifold coupled to at least one of said core engine nozzle and said fan nozzle; and
a plurality of tube pairs coupled to said manifold and are selectively oriented to facilitate generating the vortex in at least one of said core engine nozzle exhaust flowpath and fan nozzle exhaust flowpath.

17. A gas turbine in accordance with claim 16 wherein each of said plurality of tube pairs comprises:
a first tube that extends radially inward at an angle ÿ with respect to a centerline axis
a second tube that extends radially inward at the angle ÿ with respect to the centerline axis, said first tube and said second tube separated by an angle ÿ.

18. A gas turbine in accordance with claim 15 wherein air is distributed substantially uniformly among said plurality of tubes.

19. A gas turbine in accordance with claim 16 wherein said noise suppression system further comprises:
the manifold coupled to said gas turbine nozzle; and
exactly eight tube pairs coupled to said manifold, each of said eight tube pairs are selectively oriented to facilitate generating the vortex in said gas turbine nozzle flowpath.

20. A gas turbine in accordance with claim 15 wherein said noise suppression system further comprises an actuation valve selectively operable to discharge air from said gas turbine engine into said noise suppression system during at least one of a continuous operation mode and a pulsed operation mode of said noise suppression system.

* * * * *